United States Patent
Barsness et al.

(10) Patent No.: US 10,901,853 B2
(45) Date of Patent: Jan. 26, 2021

(54) CONTROLLING PROCESSING ELEMENTS IN A DISTRIBUTED COMPUTING ENVIRONMENT

(71) Applicant: International Business Machines Corporation, Armonk, NY (US)

(72) Inventors: Eric L. Barsness, Pine Island, MN (US); Daniel Beuch, Rochester, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/037,300

(22) Filed: Jul. 17, 2018

(65) Prior Publication Data
US 2020/0026605 A1    Jan. 23, 2020

(51) Int. Cl.
| G06F 11/14 | (2006.01) |
| H04L 29/08 | (2006.01) |
| G06F 11/30 | (2006.01) |
| G06F 11/34 | (2006.01) |
| G06F 11/20 | (2006.01) |

(52) U.S. Cl.
CPC ...... *G06F 11/1438* (2013.01); *G06F 11/1482* (2013.01); *G06F 11/2023* (2013.01); *G06F 11/3006* (2013.01); *G06F 11/3409* (2013.01); *H04L 67/1044* (2013.01)

(58) Field of Classification Search
CPC ............ G06F 11/1438; G06F 11/1482; G06F 11/2023; G06F 11/3006; G06F 11/3409; H04L 67/1044
See application file for complete search history.

(56) References Cited

U.S. PATENT DOCUMENTS

| 6,076,095 A * | 6/2000 | Clark ...................... G06F 9/466 |
| 8,327,337 B2 * | 12/2012 | Barsness ............... G06F 11/362 |
| | | 714/38.1 |
| 9,535,794 B2 * | 1/2017 | Barr .................... G06F 11/0706 |

(Continued)

OTHER PUBLICATIONS

Jacques-Silva, Gabriela, et al. "Building user-defined runtime adaptation routines for stream processing applications." arXiv preprint arXiv:1208.4176 (2012).*

(Continued)

*Primary Examiner* — Kamini B Patel
(74) *Attorney, Agent, or Firm* — Steven Bouknight; Edell, Shapiro & Finnan, LLC

(57) ABSTRACT

A computer system controls processing elements associated with a stream computing application. A stream computing application is monitored for the occurrence of one or more conditions. One or more processing element groups are determined to be restarted based on occurrence of the one or more conditions, wherein the processing element groups each include a plurality of processing elements associated with the stream computing application. Each processing element of the determined one or more processing element groups is concurrently restarted. Embodiments of the present invention further include a method and program product for controlling processing elements within a stream computing application in substantially the same manner described above.

20 Claims, 4 Drawing Sheets

(56) References Cited

U.S. PATENT DOCUMENTS

| | | | |
|---|---|---|---|
| 9,760,441 B2 | 9/2017 | Cradick et al. | |
| 2008/0307258 A1* | 12/2008 | Challenger | G06F 11/1482 714/20 |
| 2010/0293532 A1* | 11/2010 | Andrade | G06F 11/1438 717/140 |
| 2011/0083046 A1* | 4/2011 | Andrade | G06F 11/0793 714/47.1 |
| 2013/0145031 A1* | 6/2013 | Fawcett | G06F 9/5066 709/226 |
| 2013/0145034 A1* | 6/2013 | Fawcett | H04L 67/1023 709/226 |
| 2013/0145203 A1* | 6/2013 | Fawcett | G06F 9/30007 714/3 |
| 2013/0166948 A1* | 6/2013 | Branson | G06F 11/0793 714/15 |
| 2013/0227114 A1* | 8/2013 | Vasseur | H04L 41/044 709/224 |
| 2015/0033072 A1* | 1/2015 | Barr | G06F 11/1438 714/15 |
| 2015/0154055 A1* | 6/2015 | Branson | G06F 9/5011 718/104 |
| 2016/0328450 A1* | 11/2016 | Branson | G06F 16/283 |
| 2016/0342404 A1* | 11/2016 | Fawcett | G06F 8/61 |
| 2016/0342405 A1* | 11/2016 | Fawcett | H04L 67/34 |
| 2016/0344843 A1* | 11/2016 | Fawcett | H04L 67/10 |
| 2017/0031764 A1* | 2/2017 | Cradick | G06F 11/3006 |
| 2017/0033979 A1* | 2/2017 | Cradick | H04L 43/08 |
| 2017/0070571 A1* | 3/2017 | Branson | H04L 67/1097 |
| 2017/0168748 A1* | 6/2017 | Barsness | G06F 3/0653 |
| 2017/0351633 A1* | 12/2017 | Goh | G06F 13/4221 |

OTHER PUBLICATIONS

Anonymously, Dynamic Control over Operator Interconnection and Data Routing in Stream Computing Applications, IPCOM000238360D, Aug. 20, 2014, 7 pages.

Anonymously, Managing Restart Of Non-Recoverable Changes In A Replication System, IPCOM000237486D, Jun. 19, 2014, 4 pages.

Carstens, Methods and Apparatus for Monitoring and Restarting Software Processes, SIEMENS AG 2010, IPCOM000199059D, Sep. 9, 2010, 4 pages.

Danniswara, Topology-Aware Placement of Stream Processing Components on Geographically Distributed Virtualized Environments, Degree Project in Distributed Computing, KTH Royal Institute of Technology, Stockholm, Sep. 2015, 91 pages.

Schneider, S. et al.; "Stream Processing Optimizations"; IBM Thomas J. Watson Research Center, DEBS'13 Tutorial; 2013.

* cited by examiner

CONTROLLING PROCESSING ELEMENTS IN A DISTRIBUTED COMPUTING ENVIRONMENT

BACKGROUND

1. Technical Field

Present invention embodiments relate to distributed computing environments, and more specifically, to controlling processing elements in a distributed computing environment during runtime.

2. Discussion of the Related Art

A distributed computing environment is a type of computing environment whose components are located across multiple physical computing devices. One particular type of distributed computing environment is a stream computing environment, which refers to an environment in which a sequence of data processing elements are coupled together to process streaming data in real-time. A stream computing environment can apply real-time analytic processing to a constantly-changing stream of data, enabling descriptive and predictive analytics to support real-time decisions.

When a stream computing application encounters an error condition, one or more components of the application may be restarted in order to recover from the error condition. However, given the distributed nature of the application and the nature of the error encountered, it may be difficult to determine which components to restart together.

SUMMARY

According to one embodiment of the present invention, a computer system controls processing elements associated with a stream computing application. A stream computing application is monitored for the occurrence of one or more conditions. One or more processing element groups are determined to be restarted based on occurrence of the one or more conditions, wherein the processing element groups each include a plurality of processing elements associated with the stream computing application. Each processing element of the determined one or more processing element groups is concurrently restarted. Embodiments of the present invention further include a method and program product for controlling processing elements within a stream computing application in substantially the same manner described above.

BRIEF DESCRIPTION OF THE DRAWINGS

Generally, like reference numerals in the various figures are utilized to designate like components.

DETAILED DESCRIPTION

Present invention embodiments relate to distributed computing environments, and more specifically, to controlling processing elements in a distributed computing environment during runtime. A stream computing environment is a type of distributed computing environment in which an application's components, called operators, are hosted by processing elements that are distributed across one or more nodes. A stream computing application typically receives input data in the form of tuples, passes the data through a sequence of operators that each perform some operation on the data, and outputs processed data.

When a processing element of a stream computing application encounters an error condition, the processing element may be restarted in order to restore functionality. Depending on certain conditions, such as the particular tasks assigned to a processing element, it may be beneficial to restart other processing elements associated with the processing element experiencing the error condition. Present invention embodiments determine logical groupings of processing elements so that entire groups of processing elements can be restarted together, thus minimizing any impact experienced by the stream computing application at runtime. By intelligently selecting a group of processing elements to restart together as opposed to the entire application, unnecessary downtime can be avoided.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
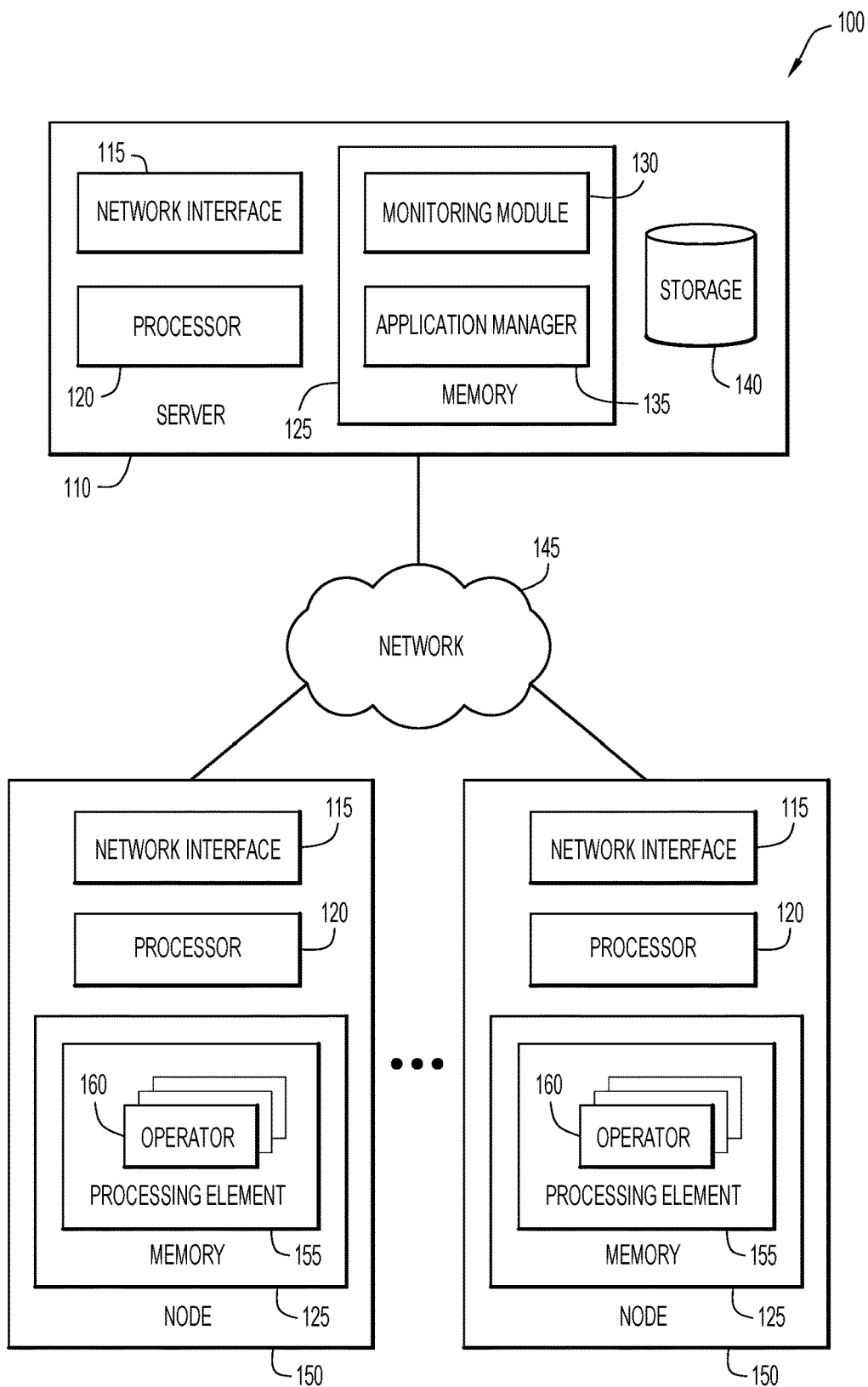
FIG. 1 is a block diagram depicting a stream computing environment for controlling processing elements in accordance with an embodiment of the present invention.

Present invention embodiments will now be described in detail with reference to the Figures. FIG. 1 is a block diagram depicting a stream computing environment 100 for controlling processing elements in accordance with an embodiment of the present invention. As depicted, computing environment 100 includes a server 110, network 145, and nodes 150. It is to be understood that the functional division among components of computing environment 100 have been chosen for purposes of explaining the present invention embodiments and is not to be construed as a limiting example.

Nodes 150 are computer systems that together host a distributed computing application, such as a stream computing application. Each node 150 includes a network interface 115, processor 120, and memory 125 with processing element 155 and operator 160. The computing resources of a node 150 may be provided by a single computing system, or a node may be a composite of multiple computing systems. Nodes 150 may include internal and external hardware components, as depicted and described in further detail with respect to FIG. 4.

Each node 150 may include one or more processing elements 155 that may each, in turn, include one or more operators 160. Thus, computing environment 100 may include several nodes 150, processing elements 155, and operators 160 upon which an application may be distributed. The number of nodes 150, processing elements 155, and operators 160 may depend on several factors, such as the computing requirements of a given application. In some embodiments, each processing element 155 is a Linux process and each operator is an IBM Streams operator. An operator 160 may receive a stream of tuples as input, perform some action on the tuples (e.g., filtering, aggregation, analytics, etc.), and output the results to the next operator 160.

Server 110 may include network interface 115, processor 120, memory 125 with monitoring module 130 and application manager 135, and storage 140. In general, server 110 may monitor and control processing elements of a stream computing application via monitoring module 130 and application manager 135. In various embodiments of the present invention, server 110 may include a laptop computer, a tablet computer, a netbook computer, a personal computer (PC), a desktop computer, a personal digital assistant (PDA), a smart phone, a thin client, or any programmable electronic device capable of executing computer readable program instructions. Server 110 may include internal and external hardware components, as depicted and described in further detail with respect to FIG. 4.

Monitoring module 130 and application manager 135 may include one or more modules or units to perform various functions of present invention embodiments described below. Monitoring module 130 and application manager 135 may be implemented by any combination of any quantity of software and/or hardware modules or units, and may reside within memory 125 of server 110 for execution by a processor, such as processor 120.

Monitoring module 130 may monitor the execution of a stream computing application in computing environment 100. In particular, monitoring module 130 may monitor processing elements (or operators therein) for error conditions. When a processing element or operator, such as processing element 155 or operator 160, encounters an error condition, the processing element or operator may report the error condition to monitoring module 130. In some embodiments, a processing element flags or logs the error condition for detection by monitoring module 130.

An error condition may include any error or exception that a processing element or operator may encounter, including any runtime error or any event, any input or output tuples that do not match expected values or value ranges, or any other occurrence indicating that a processing element or operator has encountered an error condition. When monitoring module 130 determines that a processing element or operator has encountered an error condition, monitoring module 130 may report the processing element or operator and nature of the error condition to application manager 135.

Application manager 135 may manage the execution of a stream computing application to ensure proper execution of the application. When monitoring module 130 determines that a processing element (or operator hosted by the processing element) has encountered an error, application manager 135 may determine which processing elements to restart. In particular, application manager 135 may select a group of processing elements to restart based on the processing element affected by the error condition, as well as the nature of the error condition.

Application manager 135 may determine that two or more processing elements should be treated as a processing element group based on one or more factors, including whether the processing elements are explicitly defined as members of a group, whether the processing elements are part of a sequence in an operator graph, whether the processing elements all receive input from a same processing element, and/or whether the processing elements all provide output to a same processing element. One motivation for restarting processing elements together may be to avoid queuing (e.g. bottlenecking) of tuples. Restarting processing elements together may also ensure that the processing elements can maintain state; for example, if a first processing element provides data to a second processing element that has encountered an error, restarting the first along with the second processing element may ensure that the first processing element properly re-primes the second processing element with the appropriate input data. Processing elements may also be restarted together so that any counters or metrics associated with the processing elements will all re-initialize at the same time. Once application manager 135 determines a group of processing elements to restart, application manager 135 restarts each of the processing elements belonging to the group.

Storage 140 may include any non-volatile storage media known in the art. For example, storage 140 can be implemented with a tape library, optical library, one or more independent hard disk drives, or multiple hard disk drives in a redundant array of independent disks (RAID). Similarly, data on storage 140 may conform to any suitable storage architecture known in the art, such as a file, a relational database, an object-oriented database, and/or one or more tables. Storage 140 may store program instructions for one or more stream computing applications, instructions for how to detect error conditions, and instructions for how to determine processing element groups to restart together.

Network 145 may include, for example, a local area network (LAN), a wide area network (WAN) such as the Internet, or a combination of the two, and may include wired, wireless, or fiber optic connections. In general, network 145 can be any combination of connections and protocols that will support communications between server 110 and nodes 150 (via their respective network interfaces 115) in accordance with an embodiment of the present invention.

Figure 2:
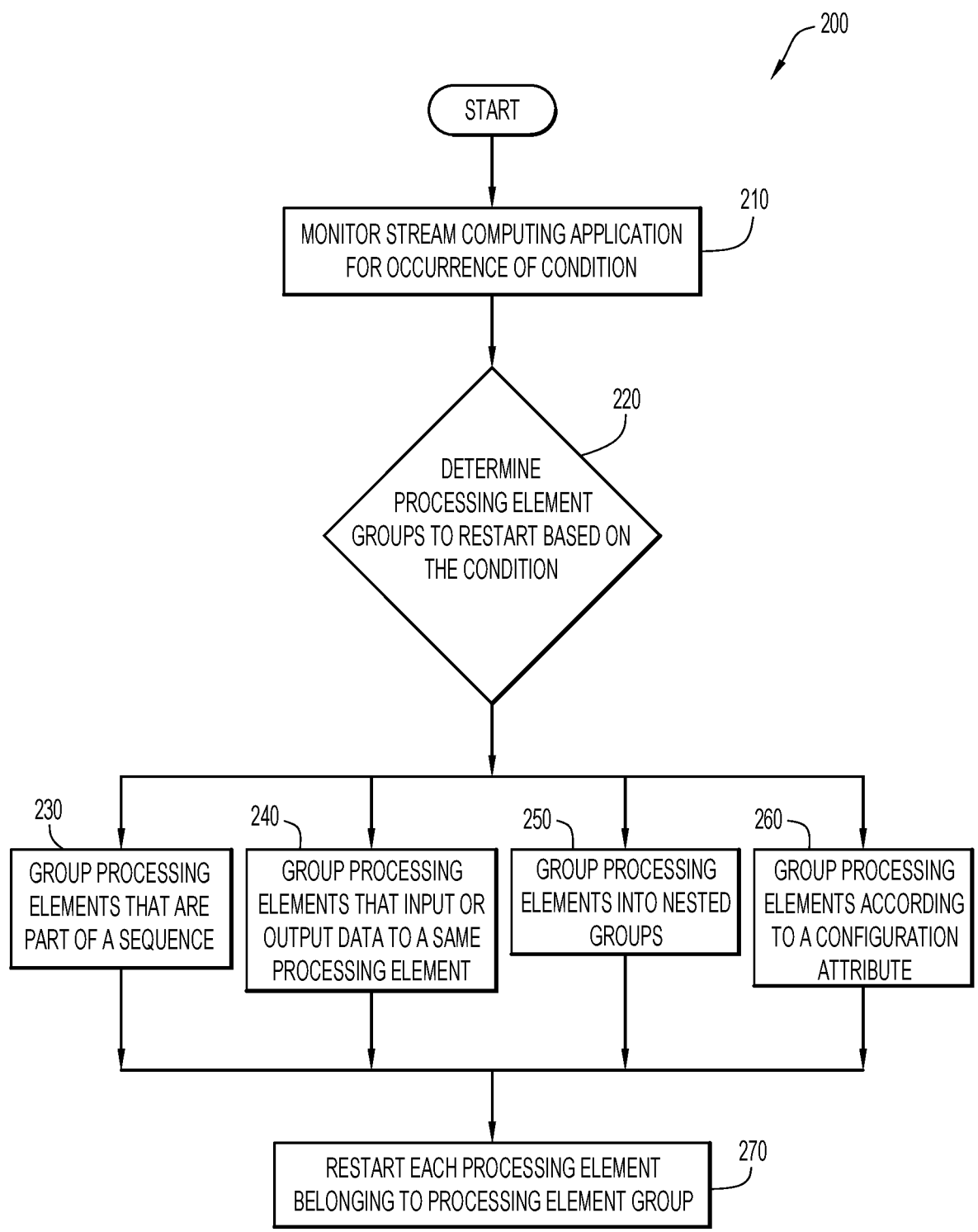
FIG. 2 is a flow chart depicting a method of controlling processing elements within a stream computing environment in accordance with an embodiment of the present invention.

FIG. 2 is a flow chart depicting a method 200 of controlling processing elements within a stream computing environment in accordance with an embodiment of the present invention.

A stream computing application is monitored for the occurrence of one or more conditions at operation 210. In some embodiments, monitoring module 130 monitors for an error condition associated with one or more processing elements of a stream computing application. Monitoring module 130 may determine that a particular processing element has experienced an error condition by receiving a notification from the processing element or by monitoring an error log. Monitoring module 130 may also determine that there is an error condition when there is abnormal tuple flow around a processing element, such as queuing of tuples or an abnormal rate of flow. When a condition is detected, monitoring module 130 may provide application manager 135 with any information collected about the condition, including the nature of the error experienced as well as the processing element(s) that have been affected.

Operation 220 determines which processing element groups to restart based on the one or more conditions that have occurred. Processing element groups may be determined according to one or more relationships between processing elements, including whether the processing elements are part of a sequence in an operator graph, whether the processing elements all receive input from, or provide input to, a same processing element, whether the processing elements form nested groups, and whether processing elements are explicitly defined as members of a group.

At operation 230, application manager 135 may group processing elements that are part of a sequence in an operator graph. For example, if a first processing element outputs tuples to a second processing element, that outputs tuples to a third processing element, then all three processing elements may be considered part of the same processing element group. Similarly, processing elements may be grouped according to how many hops in a sequence they are separated; for example, if there is a sequence of N processing elements, and a particular processing element in the middle encounters an error condition, application manager 135 may define a processing element group as all processing elements that are one hop away from the processing element in error, two hops away from the processing element in error, and the like. In some embodiments, all intervening processing elements between the processing element in error and an aggregate operator are restarted. An aggregate operator is an operator that collects information over a given interval, such as a particular span of time, or a particular amount of tuples flowing through the aggregate operator.

At operation 240, application manager 135 may group processing elements together when the processing elements all receive input from, or provide input to, a same processing element. For example, if a particular processing element that receives input from three different processing elements encounters an error condition, all four of the processing elements may be grouped together. Likewise, if a particular processing element that outputs to five different processing elements encounters an error condition, then application manager 135 may group all six processing elements together.

At operation 250, application manager 135 may nest processing element groups to create multiple levels at which the processing elements are incrementally restarted. For example, if a particular processing element encounters an error condition, a first level of processing elements that provide data to the processing element in error may be grouped together. If restarting this group does not restore proper functionality to the processing element in error, another level of processing elements may be added to the group (e.g., secondary processing elements that provide input to the primary processing elements, which directly provide input to the processing element in error). Additional levels of processing elements may be added to the group and restarted automatically until the processing element is no longer experiencing an error condition.

At operation 260, processing element groups may be defined explicitly by declaring in a configuration attribute that certain processing elements are members of a particular group. Processing element groups may be defined at compile time or at runtime. In some embodiments, processing element groups may be re-defined at runtime. When a member of a group is determined to require a restart, then the entire group may be restarted.

The distribution of a stream computing application's processing elements and operators may change during runtime. For example, workload balancing operations may move operators into different processing elements, or add or remove processing elements and/or operators altogether. Since the distribution of a stream computing application may change during runtime, application manager 135 may dynamically update the grouping of processing elements.

Each processing element belonging to the determined processing element group is restarted at operation 270. Application manager 135 may restart each processing element belonging to a processing element group concurrently, incrementally, or combinations thereof. When a processing element is restarted, any hosted operators may likewise restart.

Figure 3:
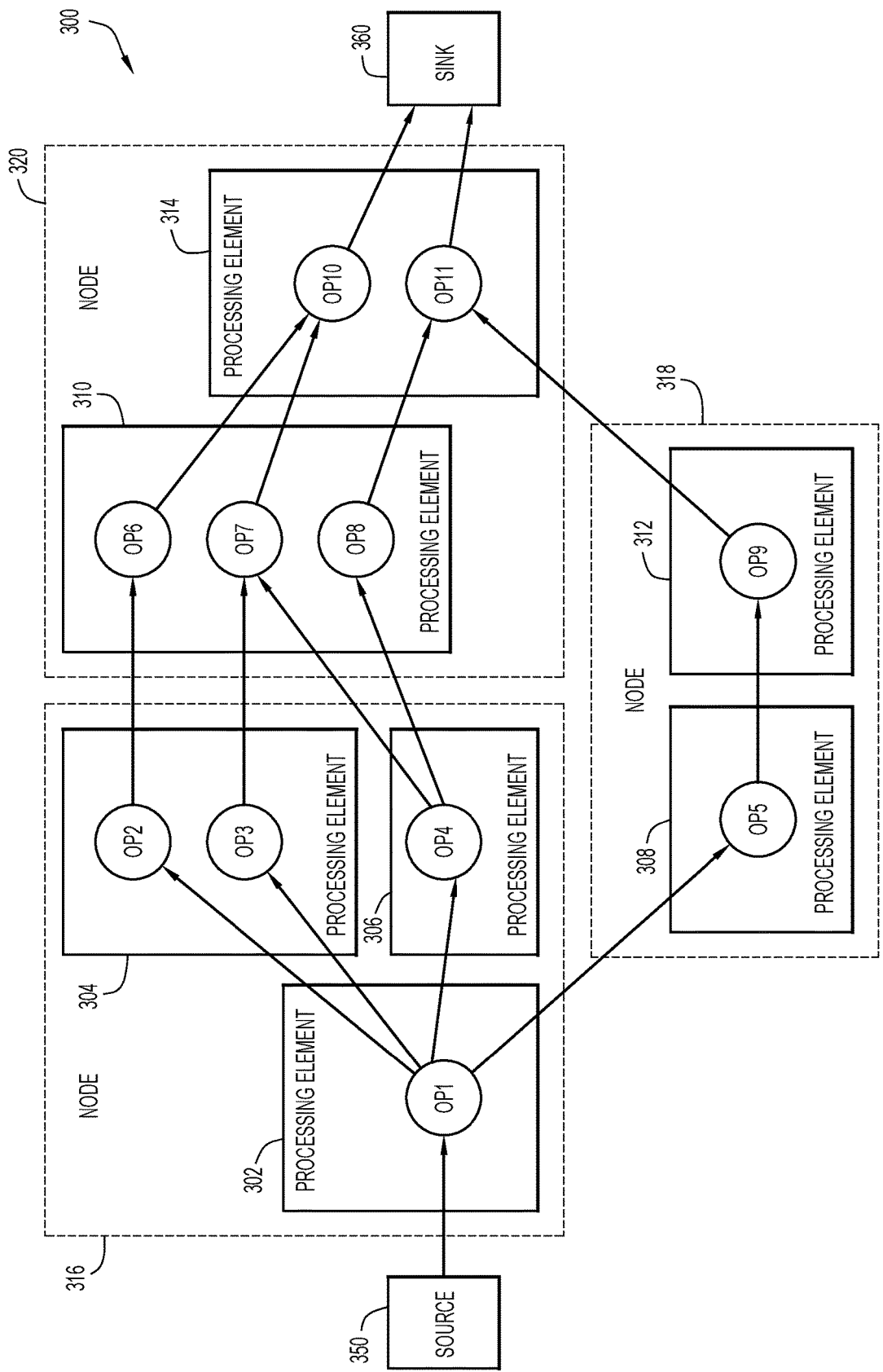
FIG. 3 illustrates an example of an operator graph of a stream computing application in accordance with an embodiment of the present invention.

FIG. 3 illustrates an example of an operator graph 300 of a stream computing application in accordance with an embodiment of the present invention. As depicted, operator graph 300 includes a source 350, nodes 316, 318, and 320, processing elements 302, 304, 306, 308, 310, 312, and 314, operators OP1-OP11, and sink 360. Generally, a stream of data flows from source 350 and is passed from operator to operator, which each perform some action on the stream, until the stream is output to sink 360. Arrows indicate the flow of the stream of tuples from operator to operator as the stream splits and merges.

Node 316 hosts processing elements 302, 304, and 306, node 318 hosts processing elements 308 and 312, and node 320 hosts processing elements 310 and 314. Processing element 302 has a single operator, OP1; similarly, processing element 306 hosts operator OP4, processing element 308 hosts operator OP5, and processing element 312 hosts operator OP9. Processing element 304 hosts operators OP2 and OP3, processing element 310 hosts operators OP6, OP7, and OP8, and processing element 314 hosts operators OP10 and OP11.

Processing elements may be grouped together when they are part of a sequence in an operator graph. For example, the flow of data from operators OP1 to OP3 to OP7 to OP10 indicates that their host processing elements 302, 304, 310, and 314, respectively, form a sequence and may be grouped together so that when one of the processing elements encounters an error condition, they are all restarted concurrently. A sequence of processing elements may run from source 350 to sink 360 or comprise only a few processing elements in series. In some embodiments, processing elements are grouped according to the number of hops that they are separated in a sequence. For example, if a group of processing elements is defined as all processing elements one hop from processing element 310, then the group may include (along with processing element 310) processing elements 304 and 306, which are one hop away in the direction of source 350, and processing element 314, which is one hop away in the direction of sink 360. Similarly, a group of processing elements that is two hops away from processing element 310 may include processing elements 302, 304, 306, 310, and 314.

Processing elements may be grouped together when the processing elements all receive input from, or provide input to, a same processing element. For example, processing elements 304, 306, and 308 all receive input from processing element 302, and may be grouped accordingly. Similarly, processing elements 310 and 312 provide input to processing element 314, and so may be grouped together.

In some embodiments, processing element groups may be nested in multiple levels which are restarted incrementally. For example, if processing element 314 encounters an error condition, then application manager 135 may first restart a processing element group comprising processing elements 310, 312, and 314. If restarting those three processing elements fails to restore functionality, then application manager 135 may restart a group of processing elements 304, 306, 308, 310, 312, and 314 (e.g. all processing elements an additional hop away in the direction of source 350). If restarting the group of six processing elements does not restore functionality to processing element 314, then all processing elements an additional hop away may be included in the group, which would include all of the processing elements in the depicted operator graph 300.

In some embodiments, processing element groups are defined explicitly by declaring in a configuration attribute that certain processing elements are members of a particular group. For example, processing elements 302, 304, 310, and 312 may be explicitly defined as a group by providing each processing element with a configuration attribute defining them as such.

Figure 4:
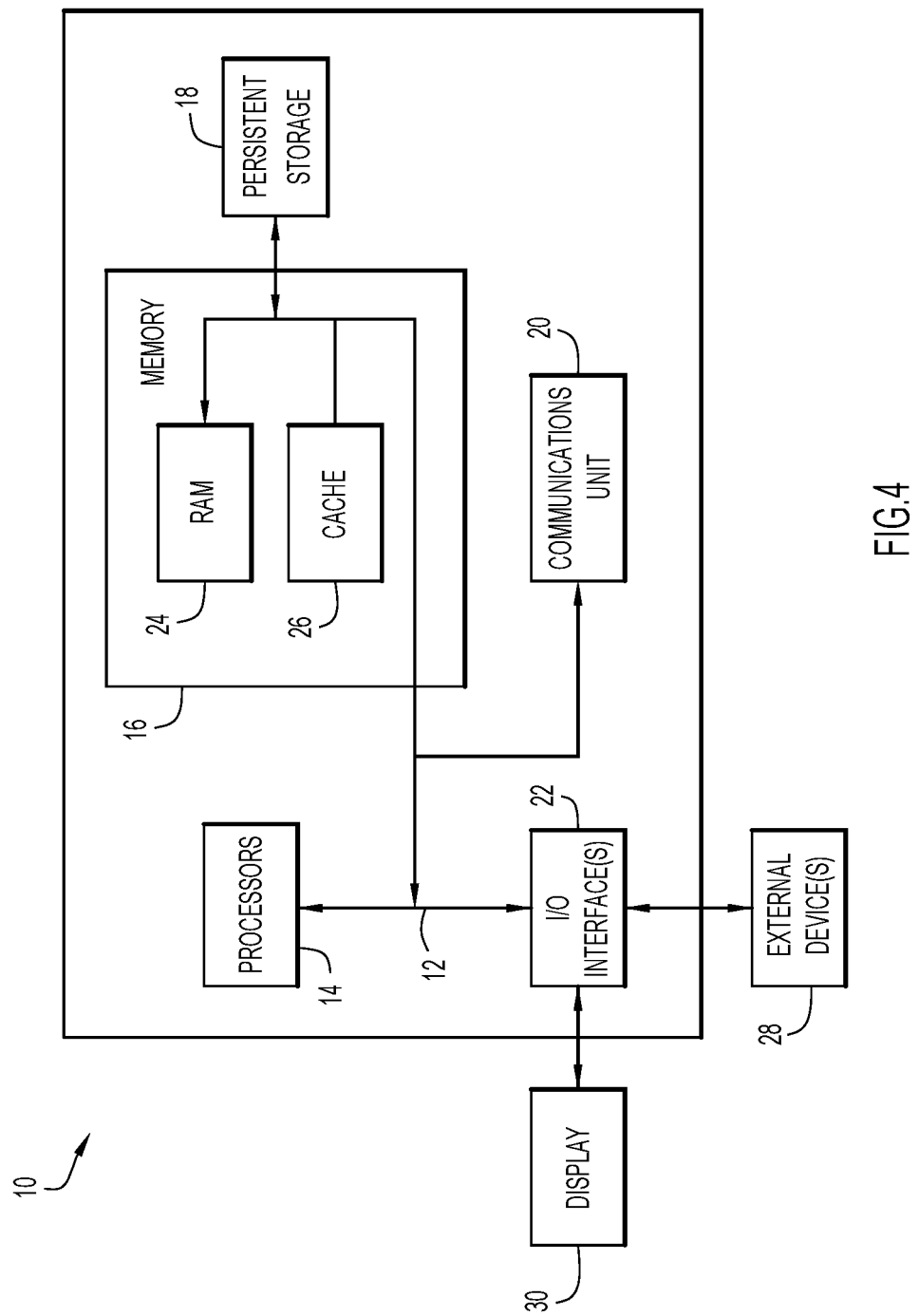
FIG. 4 is a block diagram depicting a computing device in accordance with an embodiment of the present invention.

FIG. 4 is a block diagram depicting components of a computer 10 suitable for executing the methods disclosed herein. Computer 10 may enable server 110 and nodes 150 to control processing elements in a distributed computing environment in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to distributed computing application may be stored within any conventional or other data structures (e.g., files, arrays, lists, stacks, queues, records, etc.) and may be stored in any desired storage unit (e.g., database, data or other repositories, queue, etc.) The data transmitted between server 110 and nodes 150 may include any desired format and arrangement, and may include any quantity of any types of fields of any size to store the data. The definition and data model for any data relating to a distributed computing application may indicate the overall structure in any desired fashion (e.g., computer-related languages, graphical representation, listing, etc.).

Data relating to a distributed computing environment, such as data in a computing stream, program instructions for a stream computing application (including any processing elements and operators that comprise the stream computing application), program instructions for how to control processing elements, or any metadata associated with the distributed computing environment, may include any information provided to server 110 or node 150. Data relating to a distributed computing environment may include any desired format and arrangement, and may include any quantity of any types of fields of any size to store any desired data. The fields may indicate the presence, absence, actual values, or any other desired characteristics of the data of interest (e.g., quantity, value ranges, etc.). Data relating to a distributed computing environment may include all or any desired portion (e.g., any quantity of specific fields) of any data of interest within a given implementation or system. Data relating to a distributed computing environment may indicate the overall structure in any desired fashion (e.g., computer-related languages, graphical representation, listing, etc.).

Data that is processed in a distributed computing environment may include any data, such as data that is made available over time, or an amount of data that is available immediately. A distributed computing environment may perform any operation on any data that it processes. A distributed computing environment may include any number of nodes, processing elements, and operators, arranged in parallel and/or in series or any combination thereof. Data may flow through portions a distributed computing environment in a forward (e.g., toward a data sink) direction, backward (e.g., toward a data source) direction, in a lateral direction, or any combination thereof.

The present invention embodiments may employ any number of any type of user interface (e.g., Graphical User Interface (GUI), command-line, prompt, etc.) for obtaining or providing information (e.g., data relating to controlling processing elements), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of implementing embodiments for controlling processing elements in a distributed computing environment.

The distributed computing environment of the present invention embodiments may include any number of computer or other processing systems (e.g., client or end-user systems, server systems, nodes, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., distributed computing software, communications software, server software, monitoring module 130, application manager 135, processing element 155, operator 160, etc.). These systems may include any types of monitors and input devices (e.g., keyboard, mouse, voice recognition, etc.) to enter and/or view information.

It is to be understood that the software (e.g., distributed computing software, communications software, server software, monitoring module 130, application manager 135, processing element 155, operator 160, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., distributed computing software, communications software, server software, monitoring module 130, application manager 135, processing element 155, operator 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., stream computing data, program instructions for a stream computing application, program instructions for how to control processing elements in a stream computing application, or metadata corresponding to a distributed computing environment, etc.). The database system may be implemented by any number of any conventional or other databases, data stores or storage structures (e.g., files, databases, data structures, data or other repositories, etc.) to store information (e.g., stream computing data, program instructions for a stream computing application, program instructions for how to control processing elements in a stream computing application, or metadata corresponding to a distributed computing environment, etc.). The database system may be included within or coupled to the server and/or client systems. The database systems and/or storage structures may be remote from or local to the computer or other processing systems, and may store any desired data (e.g., stream computing data, program instructions for a stream computing application, program instructions for how to control processing elements in a stream computing application, or metadata corresponding to a distributed computing environment, etc.).

The present invention embodiments may employ any number of any type of user interface (e.g., Graphical User Interface (GUI), command-line, prompt, etc.) for obtaining or providing information (e.g., any data provided to and/or generated by a distributed computing environment), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of controlling processing elements associated with a stream computing application comprising:
    monitoring a stream computing application for occurrence of one or more conditions;
    determining one or more processing element groups to restart based on occurrence of the one or more conditions, wherein the processing element groups each include a plurality of processing elements associated with the stream computing application, wherein each processing element includes one or more operators, wherein the plurality of processing elements includes at least one processing element having a first operator that receives as input data that is output by a second operator of another processing element, and wherein the one or more processing element groups include one or more processing elements that are a number of hops away from a processing element that is associated with the one or more conditions; and
    concurrently restarting each processing element of the determined one or more processing element groups while maintaining execution of processing elements of the stream computing application that are not included in the one or more processing element groups determined to be restarted.

2. The computer-implemented method of claim 1, wherein determining one or more processing element groups further comprises:
    establishing at least one processing element group based on a configuration attribute.

3. The computer-implemented method of claim 1, wherein the one or processing elements include a plurality of operators, and determining one or more processing element groups further comprises:
    establishing at least one processing element group based on locations of processing elements within an operator graph indicating a flow through the operators.

4. The computer-implemented method of claim 1, wherein the one or processing elements include a plurality of operators, and determining one or more processing element groups further comprises:
    establishing at least one processing element group based on processing elements associated with a common operator.

5. The computer-implemented method of claim 1, wherein determining one or more processing element groups further comprises:
    establishing at least one processing element group based on effects of restarting other processing elements.

6. The computer-implemented method of claim 1, wherein the one or more processing elements include a plurality of operators and the one or more conditions include one or more from a group of abnormal flow of data tuples and improper operation of an operator, and the method further comprises:
    incrementally restarting additional processing elements, by incrementing the number of hops to expand the one or more processing element groups, to remove a presence of the one or more conditions.

7. The computer-implemented method of claim 1, wherein determining one or more processing element groups further comprises:
    determining one or more processing elements to restart; and
    determining the one or more processing element groups containing the one or more processing elements to restart.

8. A computer system for controlling processing elements associated with a stream computing application, the computer system comprising:
    one or more computer processors;
    one or more computer readable storage media;
    program instructions stored on the one or more computer readable storage media for execution by at least one of the one or more computer processors, the program instructions comprising instructions to:
    monitor a stream computing application for occurrence of one or more conditions;
    determine one or more processing element groups to restart based on occurrence of the one or more conditions, wherein the processing element groups each include a plurality of processing elements associated with the stream computing application, wherein each processing element includes one or more operators, wherein the plurality of processing elements includes at least one processing element having a first operator that receives as input data that is output by a second operator of another processing element, and wherein the one or more processing element groups include one or more processing elements that are a number of hops away from a processing element that is associated with the one or more conditions; and
    concurrently restart each processing element of the determined one or more processing element groups while maintaining execution of processing elements of the stream computing application that are not included in the one or more processing element groups determined to be restarted.

9. The computer system of claim 8, wherein the instructions to determine one or more processing element groups further comprise instructions to:
  establish at least one processing element group based on a configuration attribute.

10. The computer system of claim 8, wherein the one or processing elements include a plurality of operators, and the instructions to determine one or more processing element groups further comprise instructions to:
  establish at least one processing element group based on locations of processing elements within an operator graph indicating a flow through the operators.

11. The computer system of claim 8, wherein the one or processing elements include a plurality of operators, and the instructions to determine one or more processing element groups further comprise instructions to:
  establish at least one processing element group based on processing elements associated with a common operator.

12. The computer system of claim 8, wherein the instructions to determine one or more processing element groups further comprise instructions to:
  establish at least one processing element group based on effects of restarting other processing elements.

13. The computer system of claim 8, wherein the one or more processing elements include a plurality of operators and the one or more conditions include one or more from a group of abnormal flow of data tuples and improper operation of an operator, and the program instructions further comprises instructions to:
  incrementally restart additional processing elements, by incrementing the number of hops to expand the one or more processing element groups, to remove a presence of the one or more conditions.

14. The computer system of claim 8, wherein the instructions to determine one or more processing element groups further comprise instructions to:
  determine one or more processing elements to restart; and
  determine the one or more processing element groups containing the one or more processing elements to restart.

15. A computer program product for controlling processing elements associated with a stream computing application, the computer program product comprising one or more computer readable storage media collectively having program instructions embodied therewith, the program instructions executable by a computer to cause the computer to:
  monitor a stream computing application for occurrence of one or more conditions;
  determine one or more processing element groups to restart based on occurrence of the one or more conditions, wherein the processing element groups each include a plurality of processing elements associated with the stream computing application, wherein each processing element includes one or more operators, wherein the plurality of processing elements includes at least one processing element having a first operator that receives as input data that is output by a second operator of another processing element, and wherein the one or more processing element groups include one or more processing elements that are a number of hops away from a processing element that is associated with the one or more conditions; and
  concurrently restart each processing element of the determined one or more processing element groups while maintaining execution of processing elements of the stream computing application that are not included in the one or more processing element groups determined to be restarted.

16. The computer program product of claim 15, wherein the instructions to determine one or more processing element groups further comprise instructions to:
  establish at least one processing element group based on a configuration attribute.

17. The computer program product of claim 15, wherein the one or processing elements include a plurality of operators, and the instructions to determine one or more processing element groups further comprise instructions to:
  establish at least one processing element group based on locations of processing elements within an operator graph indicating a flow through the operators.

18. The computer program product of claim 15, wherein the one or more processing elements include a plurality of operators, and the instructions to determine one or more processing element groups further comprise instructions to:
  establish at least one processing element group based on processing elements associated with a common operator.

19. The computer program product of claim 15, wherein the one or more processing elements include a plurality of operators and the one or more conditions include one or more from a group of abnormal flow of data tuples and improper operation of an operator, and the program instructions further comprises instructions to:
  incrementally restart additional processing elements, by incrementing the number of hops to expand the one or more processing element groups, to remove a presence of the one or more conditions.

20. The computer program product of claim 15, wherein the instructions to determine one or more processing element groups further comprise instructions to:
  determine one or more processing elements to restart; and
  determine the one or more processing element groups containing the one or more processing elements to restart.

* * * * *